United States Patent [19]

Todd, Jr.

[11] Patent Number: 4,877,635
[45] Date of Patent: Oct. 31, 1989

[54] HERB FLAVORING AND/OR ANTIOXIDANT COMPOSITION AND PROCESS

[75] Inventor: Paul H. Todd, Jr., Kalamazoo, Mich.

[73] Assignee: Kalamazoo Holdings, Inc., Kalamazoo, Mich.

[21] Appl. No.: 111,918

[22] Filed: Oct. 21, 1987

Related U.S. Application Data

[63] Continuation of Ser. No. 811,514, Dec. 20, 1985, abandoned.

[51] Int. Cl.$^4$ .......................... A23L 1/28; A23L 1/221
[52] U.S. Cl. ..................................... 426/542; 426/429; 252/398
[58] Field of Search ................. 426/542, 429; 252/398

[56] References Cited

U.S. PATENT DOCUMENTS

| | | | |
|---|---|---|---|
| 2,124,706 | 7/1938 | Maveety | 426/542 |
| 3,732,111 | 5/1973 | Berner et al. | 426/429 X |
| 3,950,266 | 4/1976 | Chang et al. | 426/542 X |
| 4,012,531 | 3/1977 | Viani | 426/542 X |
| 4,352,746 | 10/1982 | Bracco et al. | 426/542 X |
| 4,363,823 | 12/1982 | Kimura et al. | 426/542 |
| 4,380,506 | 4/1983 | Kimura et al. | 426/542 X |
| 4,450,097 | 5/1984 | Nakatani et al. | 426/429 X |
| 4,525,306 | 6/1985 | Yajima | 252/398 X |

FOREIGN PATENT DOCUMENTS

| | | | |
|---|---|---|---|
| 0194975 | 11/1983 | Japan | 252/398 |
| 0149982 | 8/1984 | Japan | 252/398 |

*Primary Examiner*—Joseph Golian
*Attorney, Agent, or Firm*—Gordon W. Hueschen

[57] ABSTRACT

An herb extract, particularly a member of the Labiatae family of herbs, and especially a rosemary or sage extract, made with acceptable food-grade solvents, in a form which is completely oil soluble, devoid of pro-oxidant materials, and decolorized and if desired deflavorized, to provide an improved form of herb flavoring and/or antioxidant, is disclosed. A process for transforming a crude herb extract into the new form, using food-grade solvents and without chemical modification, is also disclosed.

19 Claims, No Drawings

HERB FLAVORING AND/OR ANTIOXIDANT COMPOSITION AND PROCESS

This is a continuation of application Ser. No. 811,514, filed Dec. 20, 1985, now abandoned.

BACKGROUND OF INVENTION

1. Field of Invention

An improved and controlled natural antioxidant and/or flavor composition from rosemary and other Labiatae.

2. State of the Art

It has been known for years that members of the family Labiatae, the mint family, comprising such well-known herbs as sage, rosemary, thyme, peppermint, etc., contain substances which retard the fading of paprika and other natural colors, reduce the rate at which pork fat, and more particularly port sausage, goes rancid, and which inhibit the oxidation of fats in poultry, other meats, and baked goods, among other food items.

The use of spices, herbs, and various forms thereof for such purposes is not new to the art. Maveety (U.S. Pat. No. 2,124,706 disclosed this concept in 1938. Crude extracts of these herbs or the herbs themselves were used to achieve the intended effect. There was no ready, practical method of measuring the activity of the herb or the extract, particularly in relation to its flavor, and the use was limited.

More recently, various techniques have been developed to provide a less-flavorful extract, in both liquid and powder form. The powder form (Kimura U.S. Pat. No. 4,363,823) is made by extracting a fresh or previously steam-distilled herbal residue with, for example, alcohol, and evaporating the alcohol to form a pasty substance. Alternatively, the desolventized extract may be added to boiling water, which will dissolve the extracted water solubles and leave the insolubles, including the antioxidants, as a precipitate which can be filtered, dried, and powdered. If the precipitate is well washed with water, hygroscopic materials are removed and the resulting dried powder, containing some flavor, antioxidants, and fats and waxes, will not become hard in the presence of moist air. Non-polar solvents are not of choice, because drying of the spent herbal residue is required.

Viani (U.S. Pat. No. 4,012,531) shows the direct extraction of dried herbal materials (rosemary and sage) with an aqueous basic solution, at a pH between about 7 and 11.5 and preferably about 9, to remove the antioxidant materials from the herbal substrate. Viani points out (Col 2, line 23) that this upper limit on pH is critical, since it prevents the removal of strongly acidic, pro-oxidant substances from the rosemary. The alkaline extract may be used as such, dried, or extracted into a water-immiscible solvent such as methylene chloride following acidification. Viani's extract has a very slight rosemary odor (Example 1, Col 5, line 57).

Nakatani (U.S. Pat. No. 4,450,097) varies this procedure by first extracting the dried herb with a non-polar organic solvent such as hexane, removing the hexane, steam distilling off the volatile essential oils from an aqueous dispersion, cooling, and separating the water-insoluble rosemary extract. This deodorized extract is then dissolved in ether, acid washed, and then the ether solution is extracted with sodium bicarbonate at a pH of at least 10.5. Apparently, using bicarbonate, the weakly acidic, prooxidant fraction described by Viani is not extracted from the ether into the water. Nakatani also shows that rosemary leaves may first be steam distilled to remove the essential oils, and then extracted with a non-polar solvent and the extract refined as above. (It should be emphasized that the purified extract of the present invention greatly simplifies the processes mentioned above, since it reduces emulsions and particulate matter, and simplifies the pH separations.)

Berner (U.S. Pat. No. 3,732,111) uses an edible fat to extract the dried herb, removes the essential oil from the extract dissolved in fat, and then utilizes this deodorized extract in fat as an antioxidant. This process has the distinct disadvantage of wasting a substantial amount of edible fat in the spent herb, and in being unable to concentrate the extract.

Chang (U.S. Pat. No. 3,950,266) extracted dried rosemary leaves with organic solvent, removed the solvent, mixed the extract with a high-boiling or non-volatile edible oil such as soy oil, and steam distilled the resulting mixture to remove the flavor of rosemary, leaving behind the flavorless antioxidant fraction. He also molecularly distilled the fluid, before or after decolorizing with charcoal, to obtain a concentrated antioxidant. In addition, Chang showed that contacting the extract with solvents of greater and lesser polarity concentrated the antioxidant fraction in the solvent of greater polarity using column chromatography. Chang has the distinct advantage over Berner in providing a concentrated antioxidant which can be used in many applications in which the fat used by Berner would be objectionable.

Bracco (U.S. Pat. No. 4,352,746) utilized the discoveries of both Chang and Berner to provide a method applicable to both fat and solvent extracts of herbs. This procedure is also applicable to both steam-distilled rosemary leaves and rosemary containing the essential oil. In Bracco's invention, the extract in oil, or the solvent extract, after desolventization and suspension in oil, is micronized, and then carbonized in the presence of water by heat treatment. The carbonized suspension is sieved to remove the carbonized material, and the fluid fraction is then molecularly distilled to obtain a concentrated antioxidant fraction in the manner of Chang. However, Bracco finds that his invention allows him to use less oil than Chang, in relation to the herb. Thus, his oil may contain 5 to 20% equivalents of the vegetable starting material, as opposed to 1 to 2% for Chang's process (Col. 4, line 65). Presumably this improvement is due to the carbonization step, which removes materials which will clog the molecular distillation apparatus.

In a more recent patent, Kimura (U.S. Pat. No. 4,380,506) describes a process for the separation of an oil-soluble and an oil-insoluble (Example 3) active fraction from the herbal extract. He used ethanol-hexane mixtures ranging from 2% ethanol to 95% ethanol in hexane to extract sage, and showed that all of these mixtures were very effective extraction solvents. By adding the extract, dissolved in the extraction solvent mixture, to water he was able to separate the rosemary extract into a hexane-soluble portion and a hexane-insoluble portion. The hexane-soluble portion was also oil soluble, and had strong antioxidant activity. The precipitate formed, when the extract dissolved in solvent was added to water, was oil-insoluble, weakly antioxidant (perhaps as a result of entrained hexane-soluble materials), but useful as an anti-bacterial preservative. This precipitate is not the acetone-insoluble material according to the present invention, which does not have antibacterial properties. Kimura shares the disadvantage of Berner in losing solvent (ethanol) to the admixed water phase, and also has the disadvantage over this invention of using an amount of solvent which is ten times the weight of his spice for purifying the extract (Examples 1 and 2), which would effectively dissolve the "acetone-insoluble" materials into the hexane phase, which acetone-insoluble materials are eliminated by this invention. Kimura never eliminates the acetone-insoluble impurities from his hexane phase or otherwise.

SUMMARY OF THE INVENTION

The invention, then, comprises the following, inter alia: A process for producing an antioxidant extract of a Labiatae herb having superior antioxidant activity which contains less than 7.5% by weight of substances, comprising pro-oxidant substances, which are insoluble in acetone when the extract is diluted to a 15% w/v concentration in acetone at about 20° C., which consists essentially of the steps of extracting Labiatae herbal material with an approved food-grade solvent, removing the solvent to a concentration of about 5 to 50% of the extract in the remaining solvent, until the solvent is no more than about twenty times the weight of the extract, thereby effecting a concentration of between about 5% and 50% of the extract in such solvent, cooling the solvent and extract mixture, removing the acetone-insoluble material, and removing the solvent, said solvent being a food-grade edible solvent in which the acetone-insoluble material is soluble when warm and insoluble when cold; and a process of extracting an herb from the Labiatae family with a solvent consisting essentially of acetone, with or without the presence of a petroleum ether solvent, removing solvent until the extract is at a concentration of above about 5% and below about 50%, allowing the mixture to cool to ambient temperature, and removing insoluble material; such a process wherein the solvent is selected from the class of edible solvents consisting of acetone, methyl ethyl ketone, lower alcohols, lower esters, and petroleum ethers, said solvent being present singly on in admixture; such a process in which charcoal is added prior to removal of insoluble material; such a process in which the insoluble material is separated in the presence of an edible solvent; such a process in which the herb essential oil is removed in part or in whole following removal of acetone-insoluble material; such a process in which the solvent is acetone; such a process comprising the step of admixing one or more of the class consisting of an ascorbic acid compound, a tocopherol, and a turmeric compound, into the antioxidant extract; and a process of separating a less-polar antioxidant fraction from a more polar fraction of a Labiatae herbal extract by admixing the purified or unpurified extract with a petroleum ether solvent, removing the solvent phase from the solid phase, and desolventizing both phases with or without an edible solvent being present; and a process of separating a less-polar antioxidant fraction from a more-polar fraction of a Labiatae herbal extract, in the presence or absence of an edible solvent, by admixing the extract with a petroleum ether solvent, removing the solvent phase and desolventizing it, and admixing the petroleum ether-insoluble fraction with acetone and separating the antioxidant acetone-soluble fraction from the acetone-insoluble fraction comprising pro-oxidant material; and such a process wherein the petroleum ether is hexane or heptane. Also, an antioxidant extract of a Labiatae herb having superior antioxidant activity which contains less than 7.5% by weight of substances, comprising pro-oxidant substances, which are insoluble in acetone when the extract is diluted to a 15% w/v concentration in acetone at about 20° C.; such an extract wherein the herb is sage or rosemary, such an extract wherein the herb is selected from the class consisting of thyme, oregano, peppermint, spearmint, Monarda, and marjoram; and the petroleum-ether soluble and petroleum ether-insoluble fractions of such an extract; such an extract diluted with an edible solvent; such an extract wherein the petroleum ether is hexane or heptane; such an extract from which herb essential oil has been removed; such an extract diluted with an edible solvent; such an extract which is essentially haze-free upon dilution with a vegetable oil, and such an extract comprising a material selected from the class consisting of an ascorbic acid compound, a tocopherol, and a turmeric compound.

OBJECTS OF THE INVENTION

The objects of the invention, inter alia, are as follows: To increase the effectiveness of the natural antioxidants present in rosemary and other Labiatae; to increase the yield of the antioxidants from the herbal material; to remove unwanted and deleterious materials from the herbal extract; to provide a totally oil-soluble natural extract, retaining all the natural antioxidants of the herb; to control both the antioxidant activity of the extract and the herbal flavor in fixed ratios suitable for use in different kinds of foods and in different methods of preparation; to provide an herbal extract from the Labiatae which is compatible with a wide range of synergistic antioxidants; to provide a controlled herbal extract from which objectionable colors have been removed without loss of antioxidant activity; to demonstrate a process which is adaptable to all of these objectives using a range of acceptable food-grade solvents and under different conditions of extraction; and to make and provide herbal flavors, retaining all of their inherent antioxidant capabilties, which are soluble in, and compatible with, normally-used spice extracts, oils, and flavorings.

THE PRESENT INVENTION

According to the present invention, it has now been discovered that the extraction of rosemary and other herbs with common acceptable solvents, such as hexane, ethanol, and acetone, and even with chlorinated solvents such as methylene chloride, in a manner which maximizes yield and extraction rate, followed by a post-extraction precipitation of objectionable extracted materials from a solution of the extract, in a solvent, which preferably comprises acetone or methyl ethyl ketone, eliminates both unwanted and deleterious pro-oxidant materials as well as other insoluble materials which have no antioxidant effect and usually serve only to produce a cloudiness or haze in a vegetable oil medium in which ultimately employed.

The following examples will show:

1. The separation of the unwanted materials, and (a) the improvement in the effectiveness of the wanted materials, and (b) their increased solubility and fluidity.

2. The improvement which the elimination of the unwanted acetone-insoluble materials gives to the removal of the flavor by the method of Chang, including steam and molecular distillation.

3. The separation of the petroleum-ether solubles and insolubles and appropriate formulations of each for specific objectives.

4. The measurement of antioxidant effectivenes and flavor strength, as well as control of their ratios.

5. The preparation of antioxidant systems which are compatible with water-based systems, in that they disperse well in water alone.

6. The elimination of numerous manipulative steps required to purify the antioxidant material.

7. The total recovery of solvents, whether edible or volatile.

8. The separation of the antioxidant fraction in a polarsolvent phase, such as acetone, in which certain unwanted materials (comprising non-polar and other materials) are soluble under the extraction conditions but not under the purification conditions.

9. The use of the invention in preparing a purified extract of various herbs.

DETAILED DESCRIPTION OF THE INVENTION

The following Examples are given by way of illustration only and are not to be construed as limiting:

For the purposes of these Examples, the terms oleoresin and extract are synonymous. They are the materials dissolved into the solvent from the herb, and they are assayed quantitatively by removing the solvent from the extract dissolved in the solvent, which is also termed "miscella". For example, when rosemary is exhaustively extracted in a Soxhlet with acetone, and the acetone then removed from the miscella in the distillation flask, the residual matter is a rosemary oleoresin, or crude extract. When the crude extract has been treated with acetone in accordance with the present invention, the acetone-soluble portion, after removal of acetone, is considered as "purified extract".

EXAMPLE 1

Rosemary-Colorless Refined Antioxidant Extract 120 gms of ground Portugese rosemary were extracted in a Soxhlet with acetone, and a yield of 19.6 g was obtained. A portion of this "crude oleoresin", a solid at room temperature, was set aside. The remainder, 17.4 g, was warmed and stirred with 100 ml acetone, and then cooled to ambient temperature for five hours. It was filtered, and the solid cake washed with acetone to remove any acetone-soluble material adhering to it. Upon desolventization, the acetone-soluble antioxidant fraction weighed 12.3 g, or 71% of the crude oleoresin. The solids weighed 5.0 g or 28%, and the loss was 0.1 g or 0.6%.

A portion of acetone-soluble fraction (7.61 g) was redissolved in acetone and agitated five hours with activated charcoal (0.76 g). After filtration and evaporation at 70° C. in a rotary evaporator with water aspiration, 7.2 g were recovered, which represents a 63.5% yield of the original oleoresin. The reduction from 71.0% yield is due to coloring materials adsorbed on the charcoal, as well as to loss of lighter fractions of rosemary oil on the rotary evaporator and manipulation.

Each of these fractions was diluted in soy oil to a concentration which would give the equivalent amount of crude oleoresin. Because the oleoresins were not previously mixed with a liquid carrier, they were first stirred into hot oil, which was then stirred into a larger quantity of hot oil and allowed to cool. Observations on sediment and clarity were made: (1) the acetone-soluble oleoresins were clear and free of sediment; (2) the crude oleoresin, the acetone-insoluble fraction, and (3) a product made according to Viani and purchased on the open market, were not.

It should be mentioned that the preferred manner of preparing a formulation of rosemary or other herb product is to add an edible liquid, such as a mono- or di-glyceride, to the extraction solvent prior to its removal. This keeps the extract pasty or liquid when cool, and it does not become a hard resin difficult to redissolve. The edible liquid may be added at any point in the extraction and refining process.

It should also be mentioned that the decolorization and solid removal steps can be performed at the same time. For the purposes of this Example, they were done sequentially, as this avoids the gumming of the charcoal which makes it more difficult to filter. A further point should be mentioned: chlorophylls degrade to brownish pigments over time, which are only sparingly oil soluble. Since these pigments are removed by the charcoal, the preferred form of the invention is a decolorized extract, from which the cold acetone-insoluble materials have been removed.

The antioxidant activity level of the extracts is measured with an instrument called a Rancimat TM, which measures the induction time (proneness to rancidity) of a sample of oil containing a known amount of extract, say 0.1% or the equivalent, under accelerated aging conditions. The induction time is measured by a sharp change in conductivity of a solution into which air blown through the oil sample is passed. The oil is maintained at 120° C., and 18 liters of air per minute are passed through.

A control is also run at the same time, and the induction time of the control, say 184 minutes, is subtracted from the induction time of the sample being tested, say 254 minutes, to give a number representing the increase in stability effected by the sample, which would be 70 minutes. A second sample at the same concentration is then compared by the ratio of the increase in its induction time to that of the first sample. If, at the same concentration, the second sample increased the induction time by 80 minutes, it would be said to have the effectiveness of 114% of the reference sample.

In this case, the Rancimat stability of the crude oleoresin at 0.1% concentration was 95 minutes over the control. The acetone-insoluble fraction was *pro-oxidant*, showing an induction time at a concentration of 0.033% of 21 minutes less than the control. The decolorized acetone-soluble oleoresin showed an *increase in stability* of 111 minutes at a concentration of 0.0635%, or 117% of the crude oleoresin. Since the yield of the decolorized oleoresin was 63.5% of the crude oleoresin, this refining improves the antioxidant capabilities of the extract by 17%.

These results conclusively demonstrate that not only does the process of this invention provide a product with superior solubility, but it also increases the effectiveness of a given weight of rosemary by removing pro-oxidant materials which are present in the insoluble fraction.

EXAMPLE 2

Rosemary—Pro-oxidant Materials Removal

Rosemary was extracted commercially with a mixture of hexane and acetone (about 50—50) to make a standard oleoresin rosemary. A portion of the solvent containing the extract (miscella) was taken to the laboratory. This miscella was divided into three portions: (1) as is; (2) boiled down to about 10–20% solvent content, reconstituted with acetone to about 12% oleoresin, cooled several hours at ambient temperature, and filtered; (3) acetone added as in (2), charcoal added at a rate of 12% w/w of the oleoresin, agitated several hours, and filtered. The solvent was removed from each sample. The weight yield was recorded, and the recovered weights are reported in Table I as a percentage of the weight of the control sample (1). The table shows that 13% of the weight was removed by treatment (2), and an additional 4.5% by treatment (3). The Rancimat induction times of each finished extract were determined. Again, the yield from the unrefined extract (1) was considered to have 100% activity. It is noted that the antioxidant activity increases with the removal of unwanted pro-oxidant or antagonistic materials in steps (2) and (3). In other words, a concentration of 0.083% of sample (3) in oil has 123% of the stability of a concentration of 0.1% of sample (1) in oil.

TABLE I

| Sample | Description | % Yield (relative) | Activity of Equivalent Amounts of Extract |
|---|---|---|---|
| 1 | Total extract | 100% | 100% |
| 2 | Acetone solubles | 87% | 117% |
| 3 | Decolorized acetone solubles | 83% | 123% |

It should be noted that the amount of acetone insolubles in this Example (13%) is much below that of Example 1 (33%). These two numbers represent the extremes of the concentrations of these materials generally encountered in the herb, and may be related to freshness, the specific cultivar, season of harvest, or geographical area. The Examples show that the desirable effects of this invention are not limited to specific tyeps of rosemary herb.

The acetone insolubles can also be removed using another food-grade solvent, such as a petroleum ether such as hexane or heptane, a lower alcohol, a lower ester such as ethyl acetate, or another lower-alkyl ketone such as methyl ethyl ketone, or the like, in which the same insoluble materials are soluble warm and insoluble cold. Acetone is the preferred solvent, however, because of its cost and ease of handling and compatibility with the general solvent needs of an extraction facility. It should also be mentioned that this invention is not specific as to the organic solvent used to prepare the crude extract, any suitable food-grade solvent being acceptable.

EXAMPLE 3

Effect of Different Solvent Mixes on the Extract

Ground rosemary was exhaustively extracted in a Soxhlet using hexane, a mixture of 80% hexane and 20% acetone, and a mixture of 50% hexane and 50% acetone as well as acetone alone. These represent a wide range of possible solvent polarities, and demonstrate the flexibility of the extraction solvent which can be used in the present invention. Following extraction, the solvent was removed and the crude extract then slurried in hot acetone (8 parts), cooled, and filtered. The acetone-insoluble fraction and the soluble fraction were both desolventized, and Table II shows the percentage of acetone insolubles in the extract. The antioxidant activities of the acetone-soluble fractions were the same, again showing that the polarity of the extraction solvent is not critical, even though hot hexane is a better solvent for the "acetone insolubles", which appear to be a less polar fraction than the acetone solubles.

In Example 2, it was mentioned that the extremes of acetone insolubles generally encountered in rosemary extracts are between 13% and 33%. This Example portrays an unusual case, in which the starting ground rosemary, for an unknown reason, has about twice as much of this acetone-insoluble fraction present than usual. It shows that this invention is applicable to widely-varying kinds of rosemary and its extracts.

TABLE II

| Solvent (Hexane:Acetone) | Insolubles, %* |
|---|---|
| 100:0 | 68 |
| 80:20 | 64 |
| 50:50 | 36 |
| 0:100 | 33 |

*% = $\frac{\text{acetone insolubles}}{\text{total crude extract}} \times 100$

EXAMPLE 4

Extraction and Refining of Sage

Ground Dalmation Sage was extracted in a Soxhlet with a 70:30 mixture of hexane and acetone, and the extract desolventized. It was redissolved in hot acetone, cooled, agitated with 14% w/w of the extract of charcoal for five hours, filtered, and the filtrate desolventized. 84% of the original weight of the oleoresin was recovered, demonstrating that there are many fewer "acetone insolubles" in this sample of sage than in a typical sample of rosemary. The antioxidant activity of the decolorized, refined oleoresin was 110% of that of the original, on an equivalent weight basis. The extract was haze free when diluted in vegetable oil.

This example points out the versatility of the invention, as the insolubles may vary up and down with the type of herb, as well as with the age of the leaves, the season, the location, and the specific cultivar. Two samples of sage harvested in early and late fall 1985, had 25% and 27% acetone insolubles, respectively, in the crude extract.

It should be emphasized again that the term "acetone insolubles" as used in this specification simply refers to a class of inert and/or deleterious (including pro-oxidant) substances which can be separated from the active ingredients of the herbal extract by precipitation from a cold solvent, of which acetone is the preferred member of the class. A lower alcohol, e.g. ethyl alcohol, methyl ethyl ketone, a lower ester, or even a petroleum ether, or mixture thereof, can also be used.

EXAMPLE 5

Separation of Active Ingredients into a More Oil-Soluble and a More Water-Soluble Fraction An additional embodiment of this invention comprises the separation of the active constituents of the refined oleoresin into a more liquid oil-soluble and a more propylene-glycol or like soluble fraction. Oleoresin rosemary, from which the acetone insolubles have been removed, is mixed with two to five volumes of hot hexane or heptane, agitated well, and allowed to cool and settle. The solvent phase is decanted from the solid phase, and both phases are desolventized. 37% of the yield is in the solid fraction, and 63% in the solvent fraction. The colorless solid fraction is readily soluble in propylene glycol, for example, retains its solubility in vegetable oil, and possesses antioxidant properties. The second, solvent-soluble fraction, is readily soluble in vegetable oil and less soluble in propylene glycol and possesses both antioxidant properties and flavor and residual carotenoids. The fractions, recombined, have the same activity as the refined oleoresin.

The two fractions have essentially the same antioxidant activity, which distinguishes them from the fractions obtained by Kimura. It should also be mentioned that this invention does not have, as an objective, the provision of a preservative anti-microbial fraction, but rather of two antioxidant fractions, one containing the flavorings and antioxidant activity, and the other being soluble in both vegetable oil and propylene glycol but without flavoring. Both fractions can be steam distilled and blended with mono and/or diglycerides, etc., in accordance with other examples presented.

It will be apparent to one skilled in the art that it is not necessary to remove the "acetone insolubles" before separating the oil-soluble fraction, as the desired result can be accomplished by first agitating the crude extract with hot hydrocarbon solvent, cooling, and separating the solvent phase from the solids. The acetone insolubles, also insoluble in cold hydrocarbon solvent, can then be separated from the remainder of the oleoresin by agitation of that fraction with acetone, as in the previous examples. In this embodiment, the steps of the process are reversed. Other variations will be apparent to one skilled in the art.

The one fraction, being more polar, can be formulated in propylene glycol or glycerine to serve as an antioxidant in an aqueous system, whereas the second, more oil-soluble fraction, is useful in an oil system. This fractionation technique adds great versatility to the invention.

The propylene glycol-soluble fraction and the more oil-soluble fraction can also be diluted to a constant strength of antioxidant, using suitable compatible edible solvents, just as it is possible to standardize the activity of the parent purified extract by diluting with oil or other suitable edible solvent. Likewise, the flavor level of any given formulation may be controlled by the amount of essential oil removed, or used to fortify the purified extract. This invention therefore provides the food manufacturer with an extract standardized as to antioxidant activity and flavor level, as well as a haze-free extract both per se and when diluted with vegetable oil.

EXAMPLE 6

Solubility Characteristics of the "Acetone-Insolubles" in Acetone and in Vegetable Oil, and Maximum Acceptable Levels in the Purified Extract As pointed out in Example 1, the cold acetone insolubles may constitute up to 30–40%, and infrequently up to about ⅔, of an herb oleoresin extracted with common suitable food-grade organic solvents. A portion of the precipitate (2.6 g) from Example 1 was refluxed with about 40 ml acetone, in which it substantially dissolved. The hot acetone was filtered and evaporated to recover 2.18 g of solid material.

1.84 g of this solid material was agitated with 500 ml of acetone at 40° C., which remained slightly hazy. The solution was cooled to 19° C., agitated 1½ hours, and filtered. A total of 0.38 g was removed by filtration, the filtrate being only very slightly hazy.

100 ml of this solution was placed in capped jars which were held at different temperatures for five hours, as listed below. In addition, a sample was diluted 1:1 with acetone, and a further sample 1:1 with hexane, and held for five hours as indicated. The undiluted samples were fitered using a Whatman No. 1 paper and diatomaceous earth, and most of the haze was removed. However, a very slight amount passed through the paper in each case. The acetone was then evaporated, to determine the solubility of the "insolubles" at the specified temperature.

| Temperature at Which Held | Clarity | % Conc. w/v | Temperature at Which Filtrate Clarified |
|---|---|---|---|
| 56° C. | | 5.5 | |
| 40° | clear | 0.36 | |
| 19° | hazy | 0.29 | 25° |
| 6° | hazy | 0.23 | 25° |
| −2° | milky | 0.22 | 25° |
| acetone 1:1/8° C. | hazy | | |
| acetone/hexane 1:1/8° C. | very slight haze | | |

Firstly, these results suggest the superiority of lower temperatures as an aid in removing the insolubles, although the greatest advantage is achieved by reducing the temperature of the solution of the extract to 20° C. or below and, if equipment is available, to below 10° C.

Secondly, its points out the superiority of acetone over hexane, since apparently the insoluble materials are slightly more soluble in hexane than acetone when cold. Therefore, if an extraction solvent is chosen to contain substantial amounts of hexane because of the requirement of large volumes and cost, it is preferable to substantially remove it prior to precipitation and removal of the insolubles.

Thirdly, it points out the deficiencies in the prior art, as exemplified by Kumura's Example 2. In this Example, he extracts 50 g of rosemary with a total volume of 500 ml of solvent, consisting of a mixture of 50 ml ethanol and 450 ml hexane. Following decolorization, he removes the ethanol by admixing the miscella with water, and obtains a hexane-soluble fraction and his antimicrobial precipitate. Since, as shown in my Example 3, hexane is a good solvent for "acetone insolubles," these would be extracted from the rosemary. In the 450 ml of hexane solution after removing the ethanol with water, at least about 0.3% would remain in solution, or about 1.25 grams, a very substantial portion of the 1.94 g of hexane-soluble residue obtained. According to this invention, the 1.94 g of hexane-soluble residue would be redissolved in acetone, cooled, filtered, and the insolubles removed to recover the acetone-soluble antioxidant fraction. This is the fraction which has a high solubility in oil and will not throw a haze.

When a portion of the 2.18 g of solid acetone-insoluble material prepared above was added to soy oil at a concentration of 0.042%, it required warming to 140° C. to effect dissolution within about 30 minutes. Upon cooling for 2½ hours, a precipitate was formed, and overnight the solution became milky. A portion of this solution was diluted 1 to 1 with soy oil, warmed to 100° C. until the precipitate redissolved, and cooled overnight. A very slight haze was found, which would be acceptable in some commercial uses of the extract, indicating that a concentration of about 0.02 to 0.03% of the acetone-insoluble materials could be tolerated in a clear cooking oil.

Yajima (U.S. Pat. No. 4,525,306), who uses a *conventional* decolorized solvent extract, from which acetone-insoluble materials have not been removed (Col. 3) to stabilize capsules, suggests that the preferable use level of an extract is 0.1% to 1% w/w (Col. 4, lines 11-12). A comparable level for a refined extract in accordance with this invention would be no more than 0.5%. At this level, the extract can tolerate $0.03/0.5 \times 100\% = 6\%$ of insoluble material and, at a use level of 0.4%, 7.5% of the acetone-insoluble material. This is accordingly set as the practical upper limit of a fluid purified herb extract according to this invention when the extract is diluted to a 15% w/v concentration in acetone at about 20° C.

As the concentration of crude extract in the acetone is increased, and as the temperature of precipitation is reduced, more insolubles precipitate out so that the amount of insolubles remaining in the purified extract is reduced. The practical upper limit of concentration is determined by viscosity and the co-solvent effect of the other, active, acetone-soluble constituents of the extract. For practical purposes, the upper limit of concentration of the crude extract in the solvent is about 50%. The operating concentration is preferably varied between about 20% and 40% without impairing the quality of product but, with sufficient cooling and time for precipitation, even a concentration of 5% to 10% will remove most of the insoluble materials.

EXAMPLE 7

Commercial Extraction of Rosemary, Purification of the Extract, and Determination of the Insolubles in the Purified Extract Rosemary leaves were ground and extracted continuously with a solvent mixture of about half hexane and half acetone, at an elevated temperature.

A portion of the miscella, which is the term for the extract in solvent, was subjected to distillation and the extract concentration increased to about 50-60%. It was then diluted to a concentration of about 15% by the addition of acetone, cooled to about 20° C., and acetone-insoluble materials filtered off. Glycerides (20% w/w of acetone-soluble extract) and cottonseed oil (80% w/w of acetone-soluble extract) were added, and the solvent was then removed. On dilution with acetone to a concentration of 15% extract, heating, refrigerating, and filtering, 1.3% to 1.6% of acetone-insoluble material was recovered from the extract in oil. The liquid extract was then steam distilled (as in Chang) to remove the essential flavorful oils. The resulting extract gave a clear solution in oil at a level of 0.5%, and did not require heat to effect solution.

Another portion of the miscella was desolventized directly, without filtration of the insolubles, but with addition of glycerides and cottonseed oil, and then steam distilled. It took three times as long to remove the essential flavorful oils, showing that the removal of the insolubles and the consequent reduction in viscosity of the extract is a great advantage in the processing compared to Chang and Yajima, for example. The extract produced a haze when added to oil at a level of 0.5% and required heating to dissolve.

It should not be taken from this example that a commercial extract made according to the process of the invention will contain no less than about 1.6% of insolubles. If the filter is not fine enough, some may pass through or, if the diluted crude extract is not sufficiently cooled or allowed to fully precipitate, the results will not be as satisfactory. For the purposes of this invention, an upper limit of 7.5% of acetone-insoluble material in the extract is accepted as a practice upper limit.

EXAMPLE 8

Extraction of Thyme and other Labiatae and Refining in the Presence of an Edible Carrier Thyme (150 g), harvested in October 1985 at Kalamazoo, Mich., USA, was extracted in a Soxhlet with acetone. After the addition of 3 g of mono- and di-glycerides, the acetone was removed to yield a total of 15.1 g of crude oleoresin. This represented an 8% yield of oleoresin from the thyme, with a characteristic odor. The oleoresin and glycerides (15.1 g) were redissolved in 50 ml hot acetone, cooled for several hours, and filtered. The cake was washed with acetone, dried, and yielded 3.4 g of solids or 28% of the weight (12.1 g) of the oleoresin. The filtrate was desolventized, and was totally soluble in oil at a concentration of 0.2%.

This example shows tha common edible solvents, such as glycerides, may be present during the refining step if this is advantageous to the manufacturer, and illustrates the versatility of the invention. It is a further example of a different herb, which can be improved in oil solubility in the same manner by subsequent treatment of the crude oleoresin from the extraction solvent.

Furthermore, the oleoresin can be decolorized, as described previously, to a brownish shade. Through all of this refining, the characteristic, delightful fragrance of thyme survives, if desired, or can be removed by previous steam distillation of volatile flavor if not desired.

Extracts of other Labiatae behave in the same fashion when subjected to the foregoing treatment. A marjoram extract contained 26% acetone-insoluble material; an oregano, 37%; a spearmint, 11%; a pepperment, 12.5%; and a Monarda, 18.3%.

EXAMPLE 9

Purification of a Crude Extract

In some cases, a crude extract may be prepared, as for example by the method of Viani or Kimura, whereafter it is desirable to remove the inert and pro-oxidant materials by the process of this invention. This can be done most readily by refluxing the crude extract with acetone, allowing the mixture to cool, filtering or decanting the liquid phase from the solid phase, and formulating the refined extract as described. It should be understood that acetone is only the preferred solvent, and that other volatile organic solvents are also acceptable, as previously disclosed.

For example, 5 g of Rosemary Extract made according to the method of Viani was refluxed and agitated with 50 ml of acetone for 30 minutes, cooled, and filtered. 3.53 g of acetone-soluble and 1.45 g of acetone-insoluble material was recovered. The acetone solubles were made into a mixture with 5.4 g of soy oil and 3.2 g of mono- and di-glycerides which, when added to soy oil at a level equivalent to 0.1% of the starting extract, did not throw a haze at 12° C. overnight.

In contrast, the starting crude extract required a temperature of 150° C. to effect complete dispersion at a level of 0.1%, which dispersion remained hazy at a level of 0.05% extract. Upon filtering the hot dispersion with diatomaceous earth, it became clear but threw a precipitate upon standing overnight at 12° C.

EXAMPLE 10

Synergistic Mixtures of Natural Substances with the Purified Extracts

A purified, liquid extract made according to Example 7 contains about one part extract, 0.8 part vegetable oil, and 0.2 part mono- and di-glycerides. Since the amount of diluting, liquefying vegetable oil and glycerides is not critical, the rosemary or other Labiatae extract concentration of the liquid mixture may be increased or decreased as is convenient for a particular use. This feature also permits the blending into the liquid of other substances, which may have synergistic effects in particular fat and food systems. Accordingly, it is one of the objectives of this invention to provide a homogeneous mixture of rosemary or Labiatae extracts with a synergist.

It is known that metals, such as iron and copper, when present in fats and foods, will greatly accelerate the onset of rancidity. Frequently metal scavengers, such as critic acid or EDTA, are used to chelate and inactivate the metal. In the examples shown below, sufficient chelating agent has been added to the fat to reduce the effect of any trace metal ions on the onset of rancidity.

In the determination of the effect of synergists, a given amount of a substance, selected from the class consisting of an ascorbic acid compound, a tocopherol, and a turmeric compound, is mixed with the rosemary oleoresin above (from Example 7) and the mixture added to the fat so as to provide 0.05% rosemary oleoresin in the fat. The amount of synergist present is indicated as a percent of the rosemary extract present. For example, if a fluid mixture contains 18% rosemary extract and 9% tocopherols, the synergist is present at a level of 50% of the rosemary.

BHA (butylated hydroxyanisole), the most commonly used synthetic antioxidant, is included in the Table for comparative purposes.

The test results were evaluated using the Rancimat, as heretofore described, after accelerated aging.

| Ratio of induction time of sample to control, in specific fat. | | | | | |
|---|---|---|---|---|---|
| | Use Level | Lard | Tal- low | Chicken Fat | Partially Hydr. Fish | Soy Oil |
| Control | | 1.0 | 1.0 | 1.0 | 1.0 | 1.0 |
| Rosemary | .05 | 6.0 | 7.5 | 5.2 | 2.2 | 1.8 |
| + tocopherols* | .05 | >10 | >10 | >10 | | 1.9 |
| or ascorbates** | .05 | | 9-10 | 6.2 | | 2.9 |
| or turmeric extract | .05 | | | 9 | | |
| BHA | .05 | | 5 | 4.0 | | 1.1-1.3 |

*50% mixed tocopherols in vegetable oil
**ascorbyl palmitate; ascorbyl stearate or ascorbic acid may be substituted.

The Table shows that the purified rosemary extract is more effective than BHA is equal concentrations and that, when combined with a synergist effective in a specific fact, its usefulness is even more greatly enhanced. Because the fluid preparation of this invention is single-phase and is compatible with the synergists enumerated above, purified extracts in combination with or containing a named synergist are considered a part of this invention.

CONCLUSION

The product of this invention is a new and improved form of an herbal extract substantially devoid of haze-forming and pro-oxidant substances, which is totally oil soluble, and which may be further separated into a more oil-soluble and a more water-soluble fraction. The product of this invention retains all of the antioxidant power of the original crude extract, and may be further processed by procedures known to the art to separate out the volatile essential oils. It may be combined with synergists, and diluted with edible solvents, such as vegetable oil or glycerine, to form a liquid which is readily employed in the manufacture of food. The product may be made from herb which has been previously steam distilled to remove its essential oil but, if the full flavor of the herb is desired in the refined extract, this also flows directly from the invention by retaining the essential oil (as in Example 8) or adding it back.

The process by which this new product is obtained is simpler and less costly than the processes disclosed by the prior art, such as Nakatani, Viani, Bracco, Kimura, and Berner, but can also be employed to improve greatly the product of these prior workers.

The process itself involves a conventional but unobvious extraction step, permits use of a wide range of food-grade volatile solvents, and does not require recovery from an aqueous system of any substance which generates a troublesome emulsion. All of the volatile solvents may be re-used as they would normally be reused in an extraction operation, none being lost to water or to the spent herb as in the case of Berner.

Various modifications and equivalents will be apparent to one skilled in the art and may be made in the compounds, compositions, methods, and procedures of the present invention without departing from the spirit or scope thereof, and it is therefore to be understood that the invention is to be limited only by the full scope which can be legally attributed to the appended claims.

I claim:

1. A process for producing a natural antioxidant extract of a Labiatae herb having superior antioxidant activity, which is oil-soluble and which contains essentially all of the antioxidant factors of the natural herb, and which contains less than 7.5% by weight of substances, comprising pro-oxidant substances, which are insoluble in acetone when the extract is diluted to a 15% w/v concentration in acetone at about 20° C., which consists essentially of the steps of:

A. Providing an extract of Labiatae herbal material in an approved food-grade organic solvent which contains essentially all of the antioxidant factors of the natural herbal material, B. Removing the solvent to a concentration of about 5 to 50% of the extract in the remaining solvent, until the solvent is no more than about twenty times the weight of the extract, thereby effecting a concentration of between about 5% and 50% of the extract in such solvent, C1. In case the solvent employed is acetone or methylethyl ketone, allowing the solvent and extract mixture to stand until insoluble material precipitates, removing the precipitate, and then removing solvent from the remaining natural antioxidant extract, and C2. In case the solvent employed is not acetone or methylethyl ketone, adding sufficient acetone or methylethyl ketone to precipitate insoluble material and allowing the solvent and extract mixture to stand until insoluble material precipitates, removing the precipitate, and then removing solvent from the remaining natural antioxidant extract.

2. A process of claim 1, wherein the solvent is selected from the class of edible solvents consisting of acetone, methyl ethyl ketone, lower alcohols, lower esters, and petroleum ethers, said solvent being present singly or in admixture.

3. A process of claim 1, in which charcoal is added prior to removal of insoluble material.

4. A process of claim 1, in which the insoluble material is separated in the presence of an edible solvent.

5. A process according to claim 1, in which the herb essential oil is removed in part or in whole following removal of acetone-insoluble material.

6. A process of claim 1, in which the solvent is acetone.

7. A process of claim 1, comprising the step of admixing one or more of the class consisting of an ascorbic acid compound, a tocopherol, and a tumeric compound, into the antioxidant extract.

8. A process of extracting an herb from the Labiatae family to produce a natural antioxidant extract which is oil soluble and which contains essentially of of the antioxidant factors of the natural herb, with a solvent consisting essentially of acetone or methyl ethyl ketone, with or without the presence of a petroleum ether solvent, removing solvent until the extract is present at a concentration of above about 5% and below about 50%, allowing the mixture to stand until insoluble material precipitates, and removing the insoluble material.

9. The process of claim 2, wherein the lower-alkyl ketone is acetone.

10. A process of separating antioxidant materials from a Labiatae herbal extract containing essentially all of the antioxidant factors of the natural herb, to produce a natural antioxidant extract which is oil soluble and which contains essentially all of the antioxidant factors of the natural herb, in the presence or absence of an edible organic solvent, by admixing the extact with a petroleum ether solvent, removing the solvent phase and removing solvent therefrom to give a first antioxidant fraction, and admixing the undissolved residual petroleum ether-insoluble fraction with acetone or methylethyl ketone to a point at which the solvent is no more than about twenty times the weight of the extract, and the concentration of extract in the solvent is about 5 to 50%, and separating the soluble and second antioxidant fraction from the still insoluble fraction which comprises pro-oxidant material.

11. A process of claim 10, in wherein the petroleum ether is hexane or heptane.

12. The process of claim 10, wherein the lower-alkyl ketone is acetone.

13. The process of claim 11, wherein the lower-alkyl ketone is acetone.

14. Antioxidant extract when produced by the process of claim 8.

15. Antioxidant extract when produced by the process claim 10.

16. Antioxidant extract when produce by the process claim 1.

17. A haze-free vegetable oil solution of an extract of claim 14 or 15 or 16.

18. An extract of claim 14 or 15 or 16 wherein the herb is selected from rosemary, sage, and thyme.

19. A haze-free vegetable oil solution of an extract of claim 18.

* * * * *

UNITED STATES PATENT AND TRADEMARK OFFICE
CERTIFICATE OF CORRECTION

PATENT NO. : 4,877,635

DATED : October 31, 1989

INVENTOR(S) : Paul H. Todd, Jr.

It is certified that error appears in the above-identified patent and that said Letters Patent is hereby corrected as shown below:

Col. 1, line 19; "port" should read -- pork --

Col. 2, line 66; "perser-" should read -- preser- --

Col. 8, line 53; "mixture" should read -- mixtures --

Col. 10, line 41; "Kumura's" should read -- Kimura's --

Col. 11, line 64; "reguired" should read -- required --

Col. 12, line 5; "practice" should read -- practical --

Col. 12, line 21; "3,4" should read -- 3.4 --

Col. 12, line 24; "tha" should read -- that --

Col. 13, line 25; "critic" should read -- citric --

Col. 15, line 30; delete "of" (first occurence) and insert -- all --

Col. 16, line 20; delete "in"

Col. 16, line 29; insert -- of -- after "cess"

Col. 16, line 30; "produce" should read -- produced --

Col. 16, line 31; insert -- of -- before "claim"

Signed and Sealed this

Sixth Day of November, 1990

Attest:

HARRY F. MANBECK, JR.

*Attesting Officer*      *Commissioner of Patents and Trademarks*